United States Patent
Koizumi et al.

[11] Patent Number: 5,599,865
[45] Date of Patent: Feb. 4, 1997

[54] MOLDED PRODUCT OF A POLYPROPYLENE RESIN

[75] Inventors: Junji Koizumi; Junji Takeuchi, both of Nakashima-gun, Japan

[73] Assignee: Toyoda Goesi Co., Ltd., Nishikasugai-gun, Japan

[21] Appl. No.: 423,680

[22] Filed: May 8, 1995

Related U.S. Application Data

[63] Continuation-in-part of Ser. No. 204,569, Mar. 2, 1994, abandoned.

[30] Foreign Application Priority Data

Mar. 2, 1993 [JP] Japan .................................. 5-066079

[51] Int. Cl.$^6$ .................................................. C08C 23/12
[52] U.S. Cl. .......................... 524/413; 524/425; 524/449; 524/451; 524/496; 524/502; 524/511; 524/529; 524/582; 524/240
[58] Field of Search ..................... 524/425, 449, 524/451, 496, 502, 511, 515, 525, 529, 582, 413; 525/240

[56] References Cited

U.S. PATENT DOCUMENTS

| | | | |
|---|---|---|---|
| 5,001,182 | 3/1991 | Maruya et al. | 524/427 |
| 5,189,106 | 2/1993 | Morimoto et al. | 525/53 |
| 5,252,659 | 10/1993 | Koizumi et al. | |

OTHER PUBLICATIONS

Japanese patent abstracts of Nos. 1-271450; 2-311533; 63-95252; 63-186754; 62-153334; 61-34048; 61-21145 1989; 1990; 1988; 1988; 1990; 1986; 1986.

*Primary Examiner*—John C. Bleutoe
*Assistant Examiner*—Patrick R. Delaney
*Attorney, Agent, or Firm*—Cushman, Darby & Cushman IP Group of Pillsbury Madison & Sutro LLP

[57] ABSTRACT

The invention relates to a molded product containing 65 to 95% by weight of a polymer composition and 5 to 35% by weight of an inorganic filler. The polymer composition is a mixture of 45 to 70 parts by weight of a polypropylene resin having a melt flow rare of 10 to 60 g/10 minute and containing 0 to 8% by weight of ethylene, and 30 to 55 parts by weight of an amorphous ethylene-α-olefin copolymer. The proportion (D) of the filler and that (C) of the copolymer have the relation expressed as D>155-37 lnC. The copolymer is a mixture of 30 to 60% by weight of a high-molecular copolymer having a weight-average molecular weight of 380,000 to 1,000,000 and 40 to 70% by weight of a low-molecular one having weight-average molecular weight of 150,000 to 330,000. The product has a coefficient of linear expansion not exceeding $5.0 \times 10^{-5}$ cm/cm/°C.

11 Claims, 2 Drawing Sheets

MOLDED PRODUCT OF A POLYPROPYLENE RESIN

This is a continuation-in-part (CIP) of application Ser. No. 8/204,569, filed on Mar. 2, 1994.

BACKGROUND OF THE INVENTION

The priority application No. 66079/1993 filed Mar. 2, 1993 is hereby incorporated hereinto by reference.

1. Field of the Invention

This invention relates to a molded product of a polypropylene resin.

2. Description of Related Art

Polypropylene resins are thermoplastic resins which are excellent in mechanical properties such as flexural strength and modulus, and chemical resistance, as well as being inexpensive to produce. They are used to make a wide variety of molded products, such as parts of automobiles, industrial machines and electrical appliances for domestic use. However, these resins have the drawback of being very susceptible to thermal expansion and contraction, and therefore, typically result in molded products not having good dimensional stability.

A variety of improvements have been proposed in, for example Japanese Patent Applications Laid-Open Nos. 21145/1986, 34048/1986, 153334/1987, 186754/1988, 271450/1989 and 311533/1990, and Japanese Patent Publication No. 2620/1992 all of which are incorporated herein by reference. The polypropylene resins disclosed therein have, however, a coefficient of linear expansion in the range of $5.0 \times 10^{-5}$ to $9.0 \times 10^{-5}$ cm/cm/°C. Therefore, they are still very liable to thermal expansion and contraction, and difficult to employ for producing molded products having good dimensional stability, particularly with respect to producing molded slender parts, such as side moldings, locker moldings, side garnishes, lower door moldings and bumpers for automobiles.

We, the inventors of this invention, have, therefore, engaged in a wide range of research and experimental work to obtain a polypropylene resin having a lower coefficient of linear expansion than the prior art. Consequently, the inventors have earlier developed a molded product having a coefficient of linear expansion in the range of $3.0 \times 10^{-5}$ to $3.9 \times 10^{-5}$ cm/cm/°C., and having a high level of dimensional stability, as disclosed in Japanese Patent Application Laid-Open No. 8744/1992 incorporated herein by reference. This product is formed from poly-propylene, an amorphous ethylene-α-olefin copolymer and a fibrous filler. Its polymer component comprises 30 to 70 parts by weight of a polypropylene resin (PP) and 30 to 70 parts by weight of an amorphous ethylene-α-olefin copolymer (such as EPR) having a Mooney viscosity of less than 70 and occupies 60 to 85% by weight of the product, while EPR has an aspect ratio of 5 or more and is distributed in a flat plane to enable a lower coefficient of linear expansion. The product has, however, surface which is more sticky than that of the typical product containing PP, EPR and a fibrous filler. If it is used to make a product of injection molding not having an embossed surface, but having a mirror surface, the product tends to stick to the mold and is difficult to release, and consequently is likely to be deformed or damaged.

The inventors have therefore, considered a number of modifications to obtain a molded product of a polypropylene resin which is easy to release from a mold. They include:

(1) The use of a longer cooling time;
(2) The application of a mold release agent to the mold;
(3) The use of EPR in a lower proportion;
(4) The use of EPR having a higher molecular weight;
(5) The use of the fibrous filler in a higher proportion; and
(6) The use of two or more kinds of EPR having different compositions and physical properties.

These modifications have, however, been found undesirable for the reasons stated below.

(1) The use of a longer cooling time results in a longer molding cycle;
(2) The application of a mold release agent disables an automatic molding operation;
(3) and (4) The use of EPR in a lower proportion, or EPR having a higher molecular weight results in a resin having a high coefficient of linear expansion and consequently a molded product of low dimensional stability;
(5) The use of the fibrous filler in a higher proportion brings about a reduction in impact strength and moldability; and
(6) Although he use of two or more kinds of EPR is disclosed in the prior publications as mentioned hereinabove, none of them contains any suggestion that enables the improvement of both the dimensional stability of a molded product and its releasibility form the mold.

SUMMARY OF THE INVENTION

Under these circumstances, it is an object of this invention to provide a molded product of a polypropylene resin which has excellent dimensional stability and releasibility from a mold after injection molding, and is formed from a material of high moldability.

This object is attained by a molded product formed from a material comprising 65 to 95% by weight of a polymer composition, which composition comprises 45 to 70 parts by weight of a polypropylene resin having a melt flow rate (X) of 10 to 60 g/10 minutes and containing 0 to 8% by weight of ethylene, and also containing 30 to 55 parts by weight of an amorphous ethylene-α-olefin copolymer (EO copolymer), and 5 to 35% by weight of an inorganic filler, the proportion (C) of the EO copolymer and the proportion (D) of the filler having the relation expressed as D>155-37 lnC. The EO copolymer comprises 30 to 60% by weight of a high-molecular EO copolymer having a weight-average molecular weight of 380,000 to 1,000,000 and 40 to 70% by weight of a low-molecular EO copolymer having a weight-average molecular weight of 150,000 to 330,000. The product has a coefficient of linear. expansion not exceeding $5 \times 10^{-5}$ cm/cm/°C.

DETAILED DESCRIPTION OF THE INVENTION

The invention relates to a molded product formed from a material comprising 65 to 95% by weight of a polymer composition, which composition comprises 45 to 70 parts by weight of a polypropylene resin having a melt flow rate (X) of 10 to 60 g/10 minutes and containing 0 to 8% by weight of ethylene, and 30 to 55 parts by weight of an amorphous ethylene-α-olefin copolymer (EO copolymer), and also containing 5 to 35% by weight of an inorganic filler, the proportion (C) of the EO copolymer and the proportion (D) of the filler having the relation expressed as D>155-37 lnC. The EO copolymer comprises 30 to 60% by weight of a high-molecular EO copolymer having a weight-average molecular weight of 380,000 to 1,000,000 and 40 to 70% by weight of a low-molecular EO copolymer having a weight-average molecular weight of 150,000 to 330,000. The molded product has a coefficient of linear expansion not exceeding $5 \times 10^{-5}$ cm/cm/°C.

According to the most salient features of this invention, the polypropylene resin has a melt flow rate (X) of 10 to 60 g/10 minutes, the EO copolymer comprises a high-molecular EO copolymer having a weight-average molecular weight of 380,000 to 1,000,000 and a low-molecular EO copolymer having a weight-average molecular weight of 150,000 to 330,000, and the molded product has a coefficient of linear expansion not exceeding $5.0 \times 10^{-5}$ cm/cm/°C.

The molded product of this invention comprises 65 to 95% by weight of a polymer composition and 5 to 35% by weight of an inorganic filler. If the proportion of the polymer composition is less than 65% by weight, the product has an undesirably low level of impact strength and poor surface quality. If it exceeds 95% by weight, the product has a coefficient of linear expansion exceeding $5.0 \times 10^{-5}$ cm/cm/°C.

The polymer composition comprises 45 to 70 parts by weight of a polypropylene resin and 30 to 55 parts by weight of an EO copolymer (amorphous ethylene-α-olefin copolymer). If the proportion of the polypropylene resin is less than 45 parts by weight, the proportion of the EO copolymer is so high that the molded product becomes difficult to release from the mold and has a poor surface appearance. If it exceeds 70 parts by weight, the product has a coefficient of linear expansion exceeding $5.0 \times 10^{-5}$ cm/cm/°C.

The polypropylene resin comprises 0 to 8% by weight of ethylene and 92 to 100% by weight of polypropylene. If the proportion (Y) of ethylene exceeds 8% by weight, the molded product becomes difficult to release from the mold. The polypropylene resin has a melt flow rate (X) of 10 to 60 g/10 minutes as measured at 230° C. under a load of 2.16 kg/cm². If the meltflow rate is less than 10 g/10 minutes, the molding blend is undesirably low in flowability and necessitates an undesirably long molding cycle. In addition, the molded product has a poor surface appearance. If the meltflow rate exceeds 60 g/10 minutes, the EO copolymer is distributed less uniformly, and the molded product has a poor surface appearance.

The proportion (Y) of ethylene is preferably from 0.3 to 7.0% and more preferably form 0.5 to 6.0% by weight. The melt flow rate (X) of the resin and the proportion (Y) of ethylene preferably have the relation expressed as $Y \leq 0.08X + 3.4$ to ensure that the molded product has a particularly good balance between its coefficient of linear expansion and its releasability from the mold.

The polypropylene resin may be a homopolymer such as homopolypropylene, or a propylene-ethylene random or block copolymer, or a mixture thereof. The mixture may further contain a modified polypropylene resin, i.e., a polypropylene resin modified with an unsaturated carboxylic acid or a derivative thereof, and an organic oxide.

The EO copolymer comprises 30 to 60% by weight of a high-molecular EO copolymer and 40 to 70% by weight of a low-molecular EO copolymer. If the proportion of the high-molecular EO copolymer is less than 30% by weight, no satisfactory improvement can be achieved in the releasibility of the molded product from the mold. It if exceeds 60% by weight, the molded product has an undesirability high coefficient of linear expansion.

The high-molecular EO copolymer has a weight-average molecular weight of 380,000 to 1,000,000. If it is less than 380,000, it is so close to that of the low-molecular EO copolymer that no satisfactory improvement can be achieved in the releasability of the molded product. If it exceeds 1,000,000, the molded product has an undesirably high coefficient of linear expansion, and a bad surface appearance.

The low-molecular EO copolymer has a weight-average molecular weight of 150,000 to 330,000. The use of any copolymer having a molecular weight of less than 150,000 is undesirable because of its high crystallinity. The use of any copolymer having a molecular weight exceeding 330,000 is also undesirable, since its molecular weight is too close to that of the high-molecular EO copolymer.

The amorphous ethylene-α-olefin copolymer (EO copolymer) is a copolymer of ethylene and one or more than one α-olefin such as propylene, butene-1, hexene-1, decene-1, 4-methylbutene-1, and 4-methylpentene-1. "Amorphous" means that the copolymer has substantially no crystalline phase. Ethylene-propylene rubber (EPR), which is a copolymer of ethylene and poly-propylene, has a particularly low coefficient of linear expansion.

The proportion (C) of the amorphous EO copolymer and proportion (D) of the inorganic filler are so selected as to have the relation expressed as D>155-37 lnC, where ln is a natural logarithm. This relation is essential to achieve a coefficient of linear expansion not exceeding $5.0 \times 10^{-5}$ cm/cm/°C. (see FIG. 2).

The inorganic filler may be a fibrous or nonfibrous one, or one having, for instance, a flaky form or mixtures thereof. Specific examples of the fibrous filler are potassium titanate, magnesium oxysulfate, aluminum borate, calcium carbonate, calcium sulfate or zinc oxide whiskers, wollastonite, and glass or carbon fibers or mixtures thereof. The fibrous filler acts with the amorphous EO copolymer and contributes to achieving a low coefficient of linear expansion. The potassium titanate whiskers, for instance, are an excellent fibrous filler from the standpoints of physical properties and dimensional stability. Examples of the nonfibrous filler include talc and mica, which are flaky, and calcium carbonate in granular form.

The molding composition for the molded product of this invention may further contain various materials useable for controlling its mechanical properties, flowability, etc. including crystalline polyethylene such as high- or low-density polyethylene, and an olefin copolymer such as an ethylene-vinyl acetate copolymer, as well as a softening agent, an oxidation inhibitor, and ultraviolet absorber, a lubricant, an antistatic agent, a nucleating agent, a pigment, a flame retardant, an extender and a processing aid.

The materials for forming a molding composition are melted and kneaded together in, for example, a single- or double-screw extruder, kneader, Brabender, or Banbury mixer at a temperature which is at least equal to the melting temperature of the polypropylene resin. Then, the composition is usually pelletized, and the pellets are formed into a desired shape by e.g. injections, extrusion or blow molding.

The molded product of this invention is useful as any of various parts of automobiles such as side moldings, bumpers and side garnishes, parts of vessels, or parts of other electrical or mechanical apparatuses. It is useful, for instance, an item for which both a high level of dimensional stability and a smooth mirror surface are required.

The molded product of this invention has a coefficient of linear expansion which is $5.0 \times 10^{-5}$ cm/cm/°C. or lower. Therefore, it has a high level of dimensional stability without undergoing any appreciable thermal expansion or contraction. Moreover, it is easy to release form the mold after injection molding, and is of high moldability. Therefore, the molded product of the invention can be attached to another object without the aid of any metal insert, or other reinforcing member, even if it is in an elongated shape, while its easy releasability give it a smooth mirror surface. Thus, it is easy to remove the molded product from the mold and provide a molded product having a mirror smooth surface.

The molded product of this invention has a low coefficient of linear expansion, as described hereinabove. The low molecular EO copolymer is more compatible with polypropylene than the high-molecular one, while the latter has a lower melt viscosity. In the invention the high-molecular and low-molecular EO copolymer do not exist independently of each other in the molded product, but the low-molecular EO copolymer encloses the high molecular one. Thus, the combination of the high- and low-molecular EO copolymers is comparable to the low-molecular LEO copolymer alone in its effect of achieving a low coefficient of linear expansion. The high-molecular EO copolymer forms a finely uneven surface on the molded product, which facilitates its easy removal from the mold. The EO copolymer is uniformly distributed in a flat plane not only in the skin of the molded product, but in its core as well. It is believed that this is the reason the molded product of this invention has low coefficient of linear expansion.

DESCRIPTION OF EXAMPLES

The invention will now be described in further detail with reference to specific examples thereof and comparative examples. The examples are for illustrative purposes only, as persons skilled in the art would be aware, and are not intended to limit the scope of the invention thereto.

A variety of samples embodying this invention and comparative samples, except Sample No. E15 of this invention, were prepared by employing polypropylene resins (PP) as shown in TABLE 1, and amorphous ethylene-α-olefin copolymer (EO copolymers), or ethylene-propylene rubbers (EPR) as shown in TABLE 2. Sample No. E15 was prepared by employing an ethylene-butene copolymer instead of EPR.

The two components and talc were mixed together in the proportions shown in TABLES 3 to 7 by employing a tumbling mixer for five minutes. The mixture was melted, kneaded and pelletized. When it was kneaded, a softening agent for rubber, such as paraffin oil, was added to it in the proportion of 1 to 15 parts by weight as required to control the flowability of the composition.

The pellets were fed to the downstream end of the screws rotating in different directions of a twin-screw extruder having a length L and a diameter D of 30 mm. They were melted and kneaded to form pellets of a poly-propylene resin composition. The pellets were kneaded at a temperature of 220° C., and extruded at a rate of 7 to 8 kg per hour by employing a screw rotating speed of 100 rpm. The pellets of each composition were dried with hot air for eight hours, and injection molded to form an appropriately shaped sample by an 80-ton injection molding machine employing an injection time of 10 seconds and a resin temperature of 210° C.

Each sample was evaluated for releasability from the mold, surface appearance, coefficient of linear expansion, flexural modulus and flexural strength.
Releasability from the mold
Each sample was evaluated for its releasability from both a mold having an embossed, or rough surface and a mold having a mirror surface. Releasability was evaluated as follows:

⊚ . . . excellent releasability from the mold

○ . . . good

Δ . . . practically unacceptable from the mold

X . . . definitely unacceptable from the mold

Surface appearance (naked eye evaluation)

Each sample was evaluated for its surface appearance as follows:

⊚ . . . excellent releasability from the mold

○ . . . good

Δ . . . practically unacceptable from the mold

X . . . definitely unacceptable from the mold

Coefficient of linear expansion

The coefficient of linear expansion was determined in accordance with the American Standard of Technical Measurement D696 (ASTM-D696) method.
Flexural modulus and strength
The flexural modulus and strength were determined according to the ASTM-D790 method.
Contents of each sample are as follows:
Polypropylene resin
As shown in TABLE 1, samples of 7 different ethylene-content (% by weight) were employed.
Amorphous ethylene-α-olefin copolymer.
As shown in TABLE 2, ethylene-propylene copolymer (EPR) was employed.
Inorganic filler
Talc was employed.
The results are shown by symbols or specific values in TABLES 3 to 7.

Figure 1:
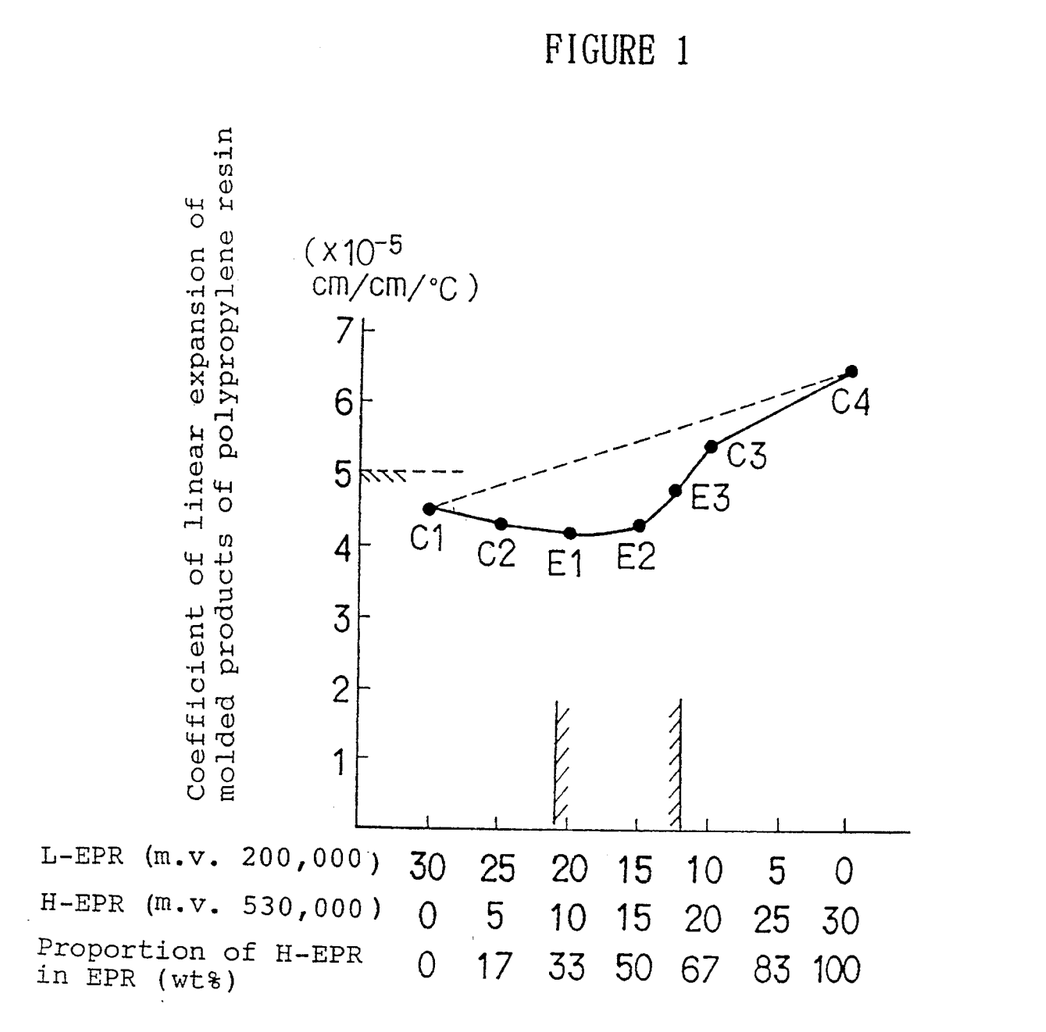
FIG. 1 is a graph showing the proportions of high-molecular EPR (H-EPR) and low-molecular EPR (L-EPR) employed to prepare samples of molded products of polypropylene resins, and their coefficients of linear expansion.

TABLE 3 and FIG. 1 show the evaluation of samples prepared by employing low-molecular EPR (L-EPR) and high-molecular EPR (H-EPR) in different proportions.

TABLE 4 shows the evaluation of samples prepared by employing L-EPR and H-EPR having different combinations of weight-average molecular weights.

TABLE 5 shows the evaluation of samples prepared by employing different proportions of EPR in the polymer components [EPR/(PP+EPR)] and different proportions of talc as an inorganic filler.

TABLE 6 shows the evaluation of samples prepared by employing polypropylene resins containing different proportions of ethylene as shown in TABLE 1.

Figure 2:
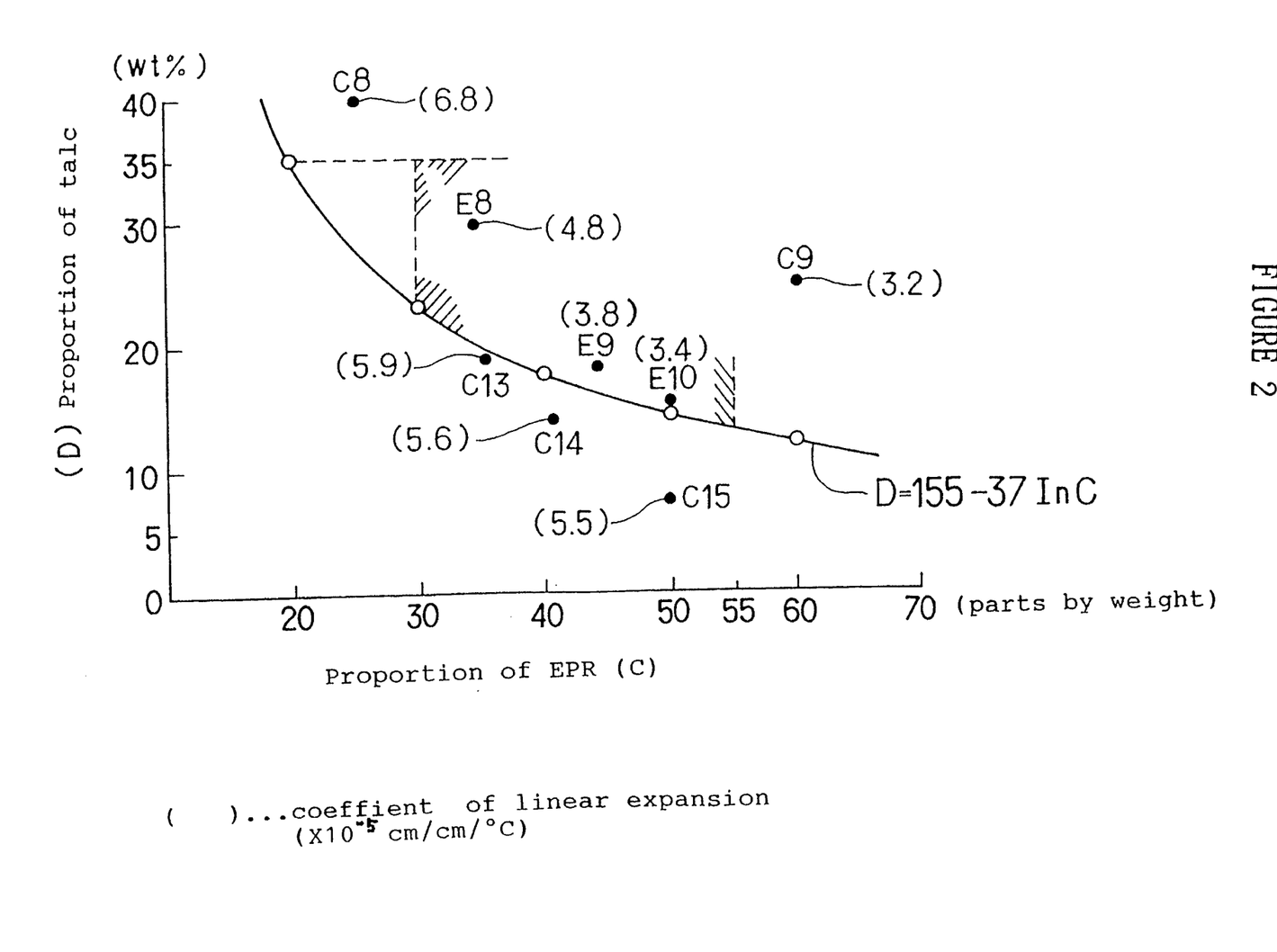
FIG. 2 is a graph showing the proportions of EPR (parts by weight) and talc (wt. %) employed to prepare samples of molded products of polypropylene resins, and their coefficients (in parenthesis) of linear expansion ($\times 10^{-5}$ cm/cm/°C.).

TABLE 7 shows the evaluation of samples prepared by employing low-molecular EO copolymers containing different α-olefins, and different proportions of EPR (C) and talc (D). FIG. 2 is a graphical representation of the results shown in TABLES 5 and 7.

In TABLES 1 to 7, (+) means that the value exceeds the upper limit of the range defined by the invention, and (−) means that it fails to reach the lower limit thereof.

In TABLES 1 and 3 to 7, A to E are the polypropylene resins employed to prepare the samples embodying this invention, while CF and CG are those employed to prepare the comparative samples.

In TABLES 2 to 7, LH, LI, LJ and LO stand for the L-EPR's employed to prepare the samples embodying this invention, and HK, HL and HM stand for the H-EPR's employed for the samples embodying this invention, while CN stands for the H-EPR employed for a comparative sample.

In TABLES 3 to 7, E1 to E15 are the numbers of the samples embodying this invention, while C1 to C15 are the numbers of the comparative samples. The proportion of each resin in the molded product of polypropylene resin is shown by wt % in the tables. H/(H+L) means the ratio of H-EPR to the total of EPR, and EPR/PP+EPR means the ratio of EPR to the total of the polymer Components. D>155-37 lnC shows the relation which is required to exist between the proportion (C) of EPR in the polymer components and the proportion (D) of talc as an inorganic filler in the molded product. The symbol "○" means that the relation exists, while the symbol "X" means that it does not.

As is obvious from TABLES 3 to 7 and FIGS. 1 and 2, Samples Nos. E1 to E15 of this invention were found to have a coefficient of linear expansion not exceeding $5.0 \times 10^{-5}$ cm/cm/°C., a flexural strength of at least 135 kg/cm$^2$ and a flexural modulus of at least 9000 kg/cm$^2$.

On the other hand, Comparative Samples Nos. C3 to C5, C7, C8, C11 and C13 to C15 had a coefficient of linear expansion exceeding $5.0 \times 10^{-5}$ cm/cm/°C. and were unacceptable from the standpoint of dimensional stability. Moreover, Comparative Samples Nos. C1, C2, C6, C9, C10 and C12 were unsatisfactory or unacceptable in releasability from the mold, and Nos. C4, C5, C7, C9 and C11 in surface appearance.

FIG. 2 confirms that the presence of the relation D>155-37 lnC between the proportion (D) of talc and that (C) of EPR is essential for achieving a coefficient of linear expansion not exceeding $5.0 \times 10^{-5}$ cm/cm/°C.

The evaluation of the various samples as hereinabove described confirms the desirably low coefficient of linear expansion of the molded product according to this invention and its desirably high flexural strength and modulus, dimensional stability, releasability from the mold, and moldability. The term releasability in Tables 3–7 means surface viscosity and the term coefficient of linear expansion in Tables 3–8 means dimensional stability.

TABLE 1

| Polypropylene resins (PP) | | |
| --- | --- | --- |
| Designation | MFR[1] | Proportion of ethylene (wt %) |
| A | 38 | 0.95 |
| B | 36 | 4.3 |
| C | 50 | 4.3 |
| D | 20 | 6.0 |
| E | 40 | 0 |
| CF | 12 | 11.5(+) |
| CG | 80(+) | 6.2 |

[1]Melt flow rate, g/10 minutes, as measured at 230° C. under a load of 2.16 kg/cm$^2$

TABLE 2

| Ethylene-propylene rubbers (EPR) | | | | | |
| --- | --- | --- | --- | --- | --- |
| Designation | weight-average molecular weight | Proportion of propylene (wt %) | Mooney viscosity[2] | MFR[3] (g/10 min.) | α-olefin |
| LH | 200,000 | 21 | 15 | 12.0 | Propylene |
| LI | 200,000 | 26 | 24 | 8.3 | Propylene |
| LJ | 310,000 | 27 | 70 | 1.8 | Propylene |
| HK | 400,000 | 28 | 100* | 0.45 | Propylene |
| HL | 530,000 | 30 | 140* | 0.1 | Propylene |
| HM | 790,000 | 27 | 200* | <0.1 | Propylene |
| CN | 1180,000 (+) | 28 | 300* | <0.1 | Propylene |
| LO | 200,000 | 15 (Butene) | — | 0.5[4] | Butene |

[2]ML$_{1+4}$ 100° C.;
*as determined from molecular weight and MFR
[3]Melt flow rate as measured at 230° C. under a load of 5 kg/cm$^2$
[4]As measured at 190° C. under a load of 2.16 kg/cm$^2$

TABLE 3

| | C1 | C2 | E1 | E2 | E3 | C3 | C4 |
| --- | --- | --- | --- | --- | --- | --- | --- |
| Polymer composition (wt %) | | | | | | | |
| PP | | | | | | | |
| A | 45 | 45 | 45 | 45 | 45 | 45 | 45 |
| B | | | | | | | |
| C | | | | | | | |
| D | | | | | | | |
| E | | | | | | | |
| CF | | | | | | | |
| CG | | | | | | | |
| EPR | | | | | | | |
| LH | 30 | 25 | 20 | 15 | 12.5 | 10 | |
| LI | | | | | | | |
| LJ | | | | | | | |
| HK | | | | | | | |
| HL | | 5 | 10 | 15 | 17.5 | 20 | 30 |
| HM | | | | | | | |
| CN | | | | | | | |
| LO | | | | | | | |
| H/(H + L) (wt %) | 0 (−) | 16.7 (−) | 33.3 | 50 | 58.3 | 66.7 (+) | 100 (+) |

TABLE 3-continued

|  | C1 | C2 | E1 | E2 | E3 | C3 | C4 |
|---|---|---|---|---|---|---|---|
| Talc (wt %) (D) | 25 | 25 | 25 | 25 | 25 | 25 | 25 |
| EPR/(PP + EPR) (C) (parts by weight) | 40 | 40 | 40 | 40 | 40 | 40 | 40 |
| D > 155-37 InC | o | o | o | o | o | o | o |
| Releasability |  |  |  |  |  |  |  |
| From a mold having an embossed surface | Δ | o | ⊙ | ⊙ | ⊙ | ⊙ | ⊙ |
| From a mold having a mirror surface | x | Δ | o | ⊙ | ⊙ | ⊙ | ⊙ |
| Surface appearance | o | o | o | o | o | o | Δ |
| MFR (g/10 min.) | 11.6 | 10.7 | 10.2 | 9.3 | 8.9 | 8.8 | 8.7 |
| Coefficient of linear expansion ($\times 10^{-5}$ cm/cm/°C.) | 4.5 | 4.3 | 4.2 | 4.3 | 4.8 | 5.4 (+) | 6.5 (+) |
| Flexural modulus (kg/cm$^2$) | 15200 | 14700 | 14300 | 14000 | 13500 | 13000 | 12400 |
| Flexural strength (kg/cm$^2$) | 225 | 200 | 190 | 175 | 172 | 165 | 151 |

Criteria for evaluation:
⊙: Excellent
o: Good
Δ: Practically unacceptable
x: Definitely unacceptable

TABLE 4

|  | E4 | E5 | E6 | E7 | C5 | C6 | C7 |
|---|---|---|---|---|---|---|---|
| Polymer composition (wt %) |  |  |  |  |  |  |  |
| PP |  |  |  |  |  |  |  |
| A | 45 | 45 | 45 | 45 | 45 | 45 | 45 |
| B |  |  |  |  |  |  |  |
| C |  |  |  |  |  |  |  |
| D |  |  |  |  |  |  |  |
| E |  |  |  |  |  |  |  |
| CF |  |  |  |  |  |  |  |
| CG |  |  |  |  |  |  |  |
| EPR |  |  |  |  |  |  |  |
| LH |  |  |  | 15 |  |  |  |
| LI | 15 |  |  | 15 | 15 | 30 |  |
| LJ |  | 15 |  |  |  |  |  |
| HK |  |  |  | 15 |  |  |  |
| HL | 15 | 15 |  |  |  |  |  |
| HM |  |  | 15 |  |  |  | 30 |
| CN |  |  |  |  | 15 |  |  |
| LO |  |  |  |  |  |  |  |
| H/(H + L) (wt %) | 50 | 50 | 50 | 50 | 50 | 0 (−) | 100 (+) |
| Talc (wt %) (D) | 25 | 25 | 25 | 25 | 25 | 25 | 25 |
| EPR/(PP + EPR) (C) (parts by weight) | 40 | 40 | 40 | 40 | 40 | 40 | 40 |
| D > 155-37 InC | o | o | o | o | o | o | o |
| Releasability |  |  |  |  |  |  |  |
| From a mold having an embossed surface | ⊙ | ⊙ | ⊙ | ⊙ | ⊙ | Δ | ⊙ |
| From a mold having a mirror surface | ⊙ | ⊙ | o | ⊙ | ⊙ | x | ⊙ |
| Surface appearance | o | o | o | o | x | o | Δ |
| MFR (g/10 min.) | 9.0 | 8.6 | 9.5 | 8.2 | 7.3 | 11.0 | 7.6 |
| Coefficient of linear expansion ($\times 10^{-5}$ cm/cm/°C.) | 4.2 | 4.8 | 4.3 | 4.6 | 5.5 (+) | 4.4 | 6.8 (+) |
| Flexural modulus (kg/cm$^2$) | 14100 | 13800 | 14700 | 13700 | 12900 | 15300 | 12000 |
| Flexural strength (kg/cm$^2$) | 186 | 180 | 182 | 178 | 165 | 220 | 143 |

Criteria for evaluation:
⊙: Excellent
o: Good
Δ: Practically unacceptable
x: Definitely unacceptable

TABLE 5

|  | C8 | E8 | E9 | E10 | C9 |
|---|---|---|---|---|---|
| Polymer composition (wt %) | | | | | |
| PP | | | | | |
| A | 45 | 49.5 | 46 | 43 | 30 |
| B | | | | | |
| C | | | | | |
| D | | | | | |
| E | | | | | |
| CF | | | | | |
| CG | | | | | |
| EPR | | | | | |
| LH | 7.5 | 12 | 18 | 21 | 22.5 |
| LI | | | | | |
| LJ | | | | | |
| HK | | | | | |
| HL | 7.5 | 12 | 18 | 21 | 22.5 |
| HM | | | | | |
| CN | | | | | |
| LO | | | | | |
| H/(H + L) (wt %) | 50 | 50 | 50 | 50 | 50 |
| Talc (wt %) (D) | 40 (+) | 30 | 18 | 15 | 25 |
| EPR/(PP + EPR) (C) (parts by weight) | 24.6 (−) | 34.8 | 43.9 | 49.4 | 60 (+) |
| D > 155-37 InC | o | o | o | o | o |
| Releasability | | | | | |
| From a mold having an embossed surface | ⊙ | ⊙ | ⊙ | ⊙ | ⊙ |
| From a mold having a mirror surface | ⊙ | ⊙ | ⊙ | ⊙ | ⊙ |
| Surface appearance | o | o | o | o | |
| MFR (g/10 min.) | 14.0 | 10.6 | 7.3 | 6.0 | 3.7 |
| Coefficient of linear expansion (× $10^{-5}$ cm/cm/°C.) | 6.5 (+) | 4.7 | 4.3 | 4.5 | 3.2 |
| Flexural modulus (kg/cm$^2$) | 23000 | 16700 | 11500 | 9000 | 4600 |
| Flexural strength (kg/cm$^2$) | 305 | 210 | 145 | 135 | 75 |

Criteria for evaluation:
⊙: Excellent
o: Good
Δ: Practically unacceptable
x: Definitely unacceptable

TABLE 6

|  | E11 | E12 | E13 | E14 | C10 | C11 | C12 |
|---|---|---|---|---|---|---|---|
| Polymer composition (wt %) | | | | | | | |
| PP | | | | | | | |
| A | | | | | | | 45 |
| B | 45 | | | | | | |
| C | | 45 | | | | | |
| D | | | 45 | | | | |
| E | | | | 45 | | | |
| CF | | | | | 45 | | |
| CG | | | | | | 45 | |
| EPR | | | | | | | |
| LH | | | | | | | 15 |
| LI | 15 | 15 | 15 | 15 | 15 | | |
| LJ | | | | | | | 15 |
| HK | | | | | | | |
| HL | 15 | 15 | 15 | 15 | 15 | 15 | |
| HM | | | | | | | |
| CN | | | | | | | |

TABLE 6-continued

|  | E11 | E12 | E13 | E14 | C10 | C11 | C12 |
|---|---|---|---|---|---|---|---|
| LO |  |  |  |  |  |  |  |
| H/(H + L) (wt %) | 50 | 50 | 50 | 50 | 50 | 50 | 0 (−) |
| Talc (wt %) (D) | 25 | 25 | 25 | 25 | 25 | 25 | 25 |
| EPR/(PP + EPR) (C) (parts by weight) | 40 | 40 | 40 | 40 | 40 | 40 | 40 |
| D > 155-37 lnC | ○ | ○ | ○ | ○ | ○ | ○ | ○ |
| Releasability |  |  |  |  |  |  |  |
| From a mold having an embossed surface | ⊚ | ⊚ | ⊚ | ⊚ | Δ | ⊚ | Δ |
| From a mold having a mirror surface | ⊚ | ⊚ | ○ | ⊚ | x | ⊚ | x |
| Surface appearance | ○ | ○ | ○ | ○ | ○ | x | ○ |
| MFR (g/10 min.) | 9.0 | 10.2 | 4.8 | 10.0 | 3.2 | 14.7 | 9.8 |
| Coefficient of linear expansion ($\times 10^{-5}$ cm/cm/°C.) | 4.1 | 4.4 | 4.3 | 4.8 | 4.2 | 5.1 (+) | 4.6 |
| Flexural modulus (kg/cm$^2$) | 13500 | 14400 | 13300 | 15200 | 10500 | 13200 | 15000 |
| Flexural strength (kg/cm$^2$) | 170 | 180 | 170 | 190 | 140 | 170 | 215 |

Criteria for evaluation:
⊚: Excellent
○: Good
Δ: Practically unacceptable
x: Definitely unacceptable

TABLE 7

|  | E15 | C13 | C14 | C15 |
|---|---|---|---|---|
| Polymer composition (wt %) |  |  |  |  |
| PP |  |  |  |  |
| A |  | 52 | 52 | 46 |
| B |  |  |  |  |
| C |  |  |  |  |
| D |  |  |  |  |
| E | 44 |  |  |  |
| CF |  |  |  |  |
| CG |  |  |  |  |
| EPR |  |  |  |  |
| LH |  | 14 | 17 | 23 |
| LI |  |  |  |  |
| LJ |  |  |  |  |
| HK |  |  |  |  |
| HL | 15 | 14 | 17 | 23 |
| HM |  |  |  |  |
| CN |  |  |  |  |
| LO | 21 |  |  |  |
| H/(H + L) (wt %) | 41.6 | 50 | 50 | 50 |
| Talc (wt %) (D) | 25 | 20 | 14 | 8 |
| EPR/(PP + EPR) (C) (parts by weight) | 45 | 35 | 39.5 | 50 |
| D > 155-37 lnC | ○ | x | x | x |
| Releasability |  |  |  |  |
| From a mold having an embossed surface | ⊚ | ⊚ | ⊚ | ⊚ |
| From a mold having a mirror surface | ⊚ | ⊚ | ⊚ | ⊚ |
| Surface appearance | ○ | ○ | ○ | ○ |
| MFR (g/10 min.) | 9.5 | 13.5 | 11.8 | 8.1 |
| Coefficient of linear expansion ($\times 10^{-5}$ cm/cm/°C.) | 4.5 | 5.9 (+) | 5.6 (+) | 5.5 (+) |
| Flexural modulus (kg/cm$^2$) | 14000 | 14400 | 12000 | 7500 |
| Flexural strength (kg/cm$^2$) | 180 | 170 | 155 | 110 |

Criteria for evaluation:
⊚: Excellent
○: Good
Δ: Practically unacceptable
x: Definitely unacceptable

What is claimed is:

1. A molded product of a polypropylene resin having a coefficient of linear expansion up to $5.0 \times 10^{-5}$ cm/cm/°C., which molded product is formed of 65 to 95% by weight of a polymer composition and 5 to 35% by weight of an inorganic filler, wherein said polymer composition comprises 45 to 70 parts by weight of a polypropylene resin and 30 to 55 parts by weight of an amorphous ethylene-α-olefin copolymer, wherein said polypropylene resin has a melt flow rate of 10 to 60 g/10 minutes and contains 0 to 8% by weight of ethylene, wherein said amorphous ethylene-α-olefin copolymer comprises 30 to 60% by weight of a high molecular ethylene-α-olefin copolymer having a weight-average molecular weight of 380,000 to 1,000,000, and 40 to 70% by weight of a low-molecular ethylene-α-olefin copolymer having a weight-average molecular weight of 150,000 to 330,000, and wherein the proportion of said filler and that of said amorphous ethylene-α-olefin copolymer has the relation expressed as D>155-37 lnC, wherein D is the proportion of said filler, C is the proportion of said amorphous ethylene-α-olefin copolymer, and ln is a natural logarithm, wherein said melt flow rate (X) of the resin and the proportion (Y) of ethylene have the relation expressed as $Y \leq 0.08X + 3.4$.

2. A molded product of a polypropylene resin according to claim 1, wherein said polypropylene resin contains 0.3 to 7.0% by weight of ethylene.

3. A molded product of a polypropylene resin according to claim 1, wherein said polypropylene resin is one or more than one copolymer selected from the group of homopolypropylene, propylene-ethylene random copolymer, propylene-ethylene block copolymer or a mixture thereof.

4. A molded product of a polypropylene resin according to claim 1 or 3, wherein said polypropylene resin contains a polypropylene resin modified with an unsaturated carboxylic acid or a derivative thereof, and an organic oxide.

5. A molded product of a polypropylene resin according to claim 1, wherein said amorphous ethylene-α-olefin copolymer has one or more than one α-olefin selected from the group consisting of propylene, butene-1, hexene-1, decene-1, 4-methylbutene-1, and 4-methylpentene-1.

6. A molded product of a polypropylene resin according to claim 1, wherein said amorphous ethylene-α-olefin copolymer is an ethylene-propylene-rubber (EPR).

7. A molded product of a polypropylene resin according to claim 1, wherein said inorganic filler is one or more than one form selected from the group consisting of fibrous, nonfibrous and flaky form.

8. A molded product of a polypropylene resin according to claim 7, wherein said fibrous filler is one or more than one selected from the group consisting of potassium titanate whisker, magnesium oxysulfate whisker, aluminum borate whisker, calcium carbonate whisker, calcium sulfate whisker, zinc oxide whisker, wollastonite, glass fiber, and carbon fiber.

9. A molded product of a polypropylene resin according to claim 7, wherein said fibrous filler is a potassium titanate.

10. A molded product of a polypropylene resin according to claim 7, wherein said nonfibrous filler is one or more than one selected from the group consisting of flaky talc, flaky mica, and calcium carbonate in granular form.

11. A molded product of a polypropylene resin according claim 1, wherein said polypropylene resin contains 0.5 to 6.0% by weight of ethylene.

* * * * *